United States Patent
Denis et al.

(10) Patent No.: US 10,066,066 B2
(45) Date of Patent: Sep. 4, 2018

(54) MULTILAYER BLOWN FILM FOR PRODUCING LABELS

(71) Applicant: Mondi Gronau GmbH, Gronau (DE)

(72) Inventors: Norbert Denis, Heek (DE); Christian Kuckertz, Olpe (DE); Ralf Niepelt, Gronau (DE)

(73) Assignee: MONDI GRONAU GMBH, Gronau (DE)

( * ) Notice: Subject to any disclaimer, the term of this patent is extended or adjusted under 35 U.S.C. 154(b) by 130 days.

(21) Appl. No.: 14/658,410

(22) Filed: Mar. 16, 2015

(65) Prior Publication Data

US 2015/0259487 A1    Sep. 17, 2015

(30) Foreign Application Priority Data

Mar. 17, 2014 (EP) .................................. 14160325

(51) Int. Cl.
| | |
|---|---|
| C08J 5/18 | (2006.01) |
| B32B 27/08 | (2006.01) |
| B32B 27/32 | (2006.01) |
| G09F 3/02 | (2006.01) |

(52) U.S. Cl.
CPC .................. *C08J 5/18* (2013.01); *B32B 27/08* (2013.01); *B32B 27/32* (2013.01); *B32B 2250/05* (2013.01); *B32B 2250/242* (2013.01); *B32B 2250/246* (2013.01); *B32B 2250/40* (2013.01); *B32B 2307/72* (2013.01); *B32B 2323/04* (2013.01); *B32B 2323/10* (2013.01); *B32B 2519/00* (2013.01); *C08J 2323/06* (2013.01); *C08J 2423/06* (2013.01); *C08J 2423/12* (2013.01); *G09F 2003/0257* (2013.01); *Y10T 428/264* (2015.01); *Y10T 428/265* (2015.01); *Y10T 428/31913* (2015.04)

(58) Field of Classification Search
CPC ................................ B32B 27/08; B32B 27/32
See application file for complete search history.

(56) References Cited

U.S. PATENT DOCUMENTS

| | | | | |
|---|---|---|---|---|
| 2008/0146762 A1* | 6/2008 | Mier | ....................... | B32B 27/32 526/351 |
| 2011/0252746 A1* | 10/2011 | Breck | ..................... | B32B 27/32 53/451 |

FOREIGN PATENT DOCUMENTS

| | | |
|---|---|---|
| DE | 102007045117 A1 | 4/2009 |
| EP | 1919706 B1 | 6/2013 |
| WO | WO 2012016938 A1 * 2/2012 | ........... B32B 27/327 |

OTHER PUBLICATIONS

"ASTM D1238-13: Standard Test Method for Melt Flow Rates of Thermoplastics by Extrusion Plastometer". ASTM International, (2013); pp. 1-16.*

(Continued)

*Primary Examiner* — Prashant J Khatri
(74) *Attorney, Agent, or Firm* — Lucas & Mercanti, LLP; Jonathan Myers

(57) ABSTRACT

The invention relates to a multilayer blown film for producing labels, having a layer construction formed by coextrusion. In accordance with the invention, the layer construction comprises two outer layers of polyethylene, a core layer of polyethylene, and, on either side of the core layer, an interlayer of polypropylene with a melt flow index of more than 4.0 g/10 min as measured to ISO 1133 at 230° C. with 2.16 kg.

11 Claims, 1 Drawing Sheet

(56) References Cited

OTHER PUBLICATIONS

Kamdar et al. "Effect of tie-layer thickness on the adhesion of ethylene-octene copolymers to polypropylene". Polymer, vol. 50, (2009); pp. 3319-3328.*

"Bimodal Molecular Weight Polyethylene for Blow Molding". Total Petrochemicals, Retrieved Nov. 2017.*

* cited by examiner

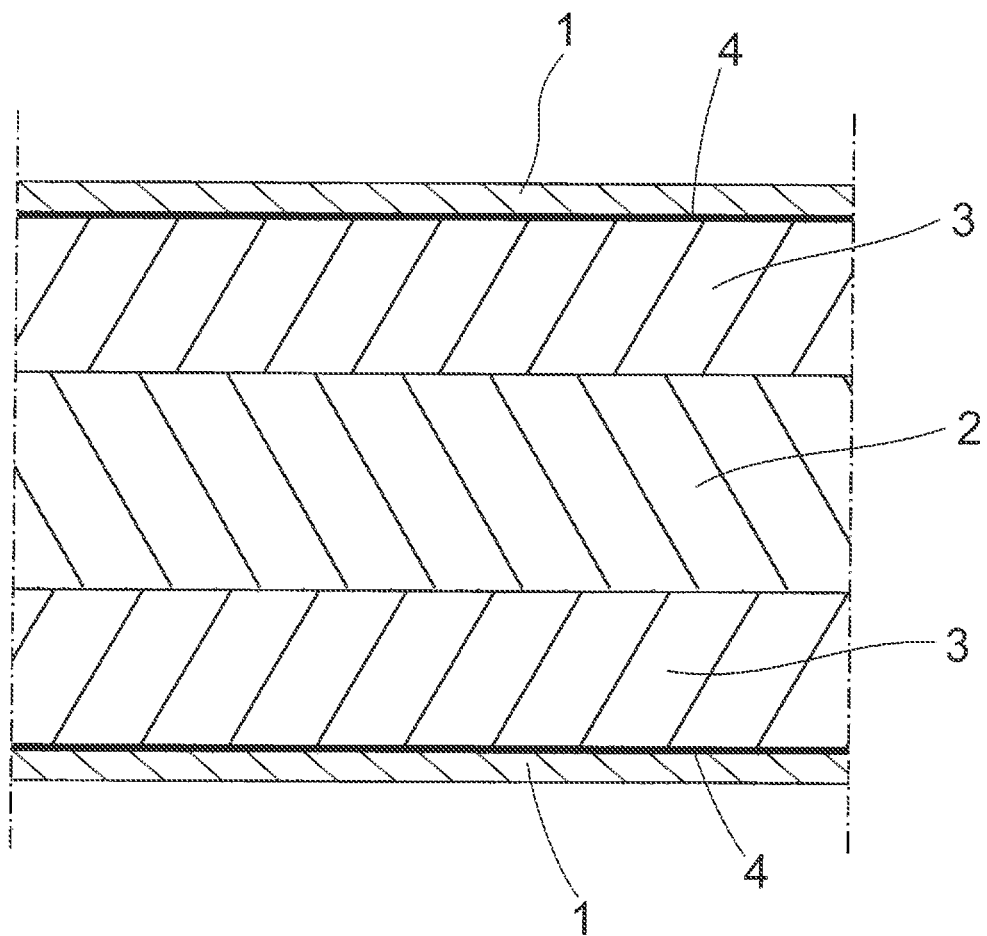

MULTILAYER BLOWN FILM FOR PRODUCING LABELS

CROSS REFERENCE TO RELATED APPLICATIONS

This application claims the benefit of the priority of the Applicants' European Patent Application EP 14 160 325.8 filed 17 Mar. 2014, the entire contents thereof expressly herein incorporated by reference.

FIELD OF THE INVENTION

The invention relates to a multilayer blown film for producing labels, having a layer construction formed by coextrusion.

BACKGROUND OF THE INVENTION

A multilayer blown film for producing labels is known from DE 10 2007 045 117 A1. The layer construction of that film comprises two outer layers of polyethylene and a core layer of a polypropylene blend. The polypropylene blend consists of 5 to 25 wt % of polypropylene homopolyraers (PP-H), 5 to 35 wt % of polypropylene random copolymers (PP-RC), and 40 to 80 wt % of polypropylene block copolymers (PP-BC). A characteristic of the core mixture is the low fraction of polypropylene homopolymers, which promote the flexural stiffness and diecuttability of the material, blended with a large fraction of PP block copolymers, which can be used to manufacture blown films having a high modulus of elasticity and a low haze. The known blown film is flexible and was developed for sharply curved surfaces. Numerous applications require greater flexural stiffness in the label film. In terms of diecuttability as well, the known film is still in need of improvement.

EP 1 919 7 06 B1 discloses a multilayer film for packaging, said film having two outside polyethylene layers and a core layer, The core layer consists of a mixture of polypropylene and a metallocene-catalyzed linear polyethylene (mLLDPE). The propylene is preferably a homopolymer and has a melt flow index of not more than 4 g/10 min (as measured to ISO 1133 at 230° C. with 2.16 kg).

From the art it is known that polypropylene with a melt, flow index higher than 4.0 g/10 min cannot be reliably processed on conventional blown film lines, since stable blown film extrusion is no longer ensured as the melt flow index increases.

OBJECTS OF THE INVENTION

Against this background, it is an object of the invention to specify a multilayer blown film for producing labels that exhibits great flexural stiffness, is distinguished by good diecutting properties, and is readily printable. In addition to these properties, further objects include high tensile strength, and a tear resistance which is balanced in different directions (production direction MD and transverse direction CD).

SUMMARY OF THE INVENTION

The subject, and the achievement of this object, is a multilayer blown film according to the invention as described herein below.

The layer construction of the blown film of the invention comprises two outer layers of polyethylene, a core layer of polyethylene, and, either side of the core layer, an interlayer of polypropylene with a melt flow index of more than 4.0 g/10 min (as measured to ISO 1133 at 230° C. with 2.16 kg). As interlayers on either side of the core layer, preference is given to using a polypropylene homopolymer having a melt flow index of 5.0 to 15 g/10 rain (ISO 1133 at 230° C. with 2.16 kg). Polypropylene with such a high melt flow index is processed primarily in the prior art as cast film. As a result of the combination of propylene layers with a polyethylene core layer, in accordance with the invention, it is possible, surprisingly, to stabilize the film bubble during the blown film extrusion. It has been found that the extent of the stabilization is such as to allow even polypropylene homopolymers to be used as interlayers, these homopolymers normally not being blowable, owing to their high melt flow index of more than 4.0 g/10 min. Through the use of polypropylene homopolymers with a high melt flow index, a significant improvement is achieved in the mechanical properties which are relevant for use as label film. Because of the large melt flow index, the polypropylene is more effectively diecuttable. Furthermore, the blown film of the invention is notable for balanced mechanical properties in production direction (HD) and in transverse direction (CD).

The core layer preferably consists of a bimodal polyethylene or of a mixture of bimodal polyethylenes having a density of between 0.925 g/cm$^3$ and 0.94 g/cm$^3$. Preference is given to using bimodal LLDPE, bimodal LMDPE or a mixture thereof for the core layer. Bimodal polyethylene has at least two polyethylene fractions which as a consequence of different polymerization conditions differ in terms of the average molecular weight and of the molecular weight distribution. The molecular weight distribution of a bimodal polymer is marked by a distribution pilot which has two maxima. In line with the molecular weight distribution, the bimodal polyethylene has optimum values, for example, in terms of mechanical strength and of stiffness. By means of the core layer consisting of polyethylene, more particularly of bimodal polyethylene, it is possible to exert a favorable influence on the toughness of the coextruded film and on its blown film extrusion processing characteristics, without substantial reduction in the stiffness of the blown film. Using a bimodal LMDPE is particularly advantageous since it allows advantageous values for stiffness, toughness, and processing characteristics to be combined with one another.

Surprisingly it has also been found that the bimodal polyethylene (LLDPE/LMDPE) exhibits excellent layer adhesion directly on polypropylene. There is therefore no need for an adhesion promoter layer between the core layer and the interlayers consisting of polypropylene.

The effect of the outer layers consisting of polyethylene is to improve the gloss, and they serve for better anchoring of any external pretreatment necessary for further steps such as adhesive coating and printing. The outer layers consist preferably of a unimodal polyethylene or of a mixture of unimodal polyethylenes. Preferred polyethylenes are those having a density of between 0.925 and 0.94 g/cm$^3$. The outer layers consist preferably of a linear polyethylene—LLDPE, LMDPE, or a mixture of LLDPE and LMDPE, it being possible for there to be a fraction of LDPE additionally.

Disposed, advantageously, between the outer layer consisting of polyethylene and the interlayer of polypropylene is an adhesion promoter layer. Copolymers of propylene and ethylene are suitable for promoting adhesion, The outer layers advantageously have a low thickness of less than 6 μm. Preferably the outer layers have a thickness of between 1 μm and 4 μm. As a result of the low thickness of the outer layers, the stiff material of the interlayers consisting of polypropylene, preferably of polypropylene homopolymer, is displaced very far to the outside, and produces a marked, improvement in the flexural stiffness.

Polypropylene interlayers influence critical mechanical properties of the blown film. Preferably, the interlayers consisting of polypropylene and also the core layer of polyethylene each have a thickness of between 10 µm and 30 µm.

The blown film may have a total thickness of between 40 µm and 100 µm. Preference is given to a total thickness of between 50 µm and 80 µm, more particularly to a total thickness of between 50 µm and 70 µm.

In a conventional way, the individual layers of the blown film may comprise additives and adjuvants. These include, in particular, antiblocking agents, processing assistants, colorants, and the like. The label film of the invention may be manufactured as transparent or colored film, in which case the outer layers consisting of polyethylene are critical to the gloss of the film. The core layer consisting of polyethylene, and the PP interlayers, may comprise color pigments. Where additions of UV stabilizers are used, they are incorporated preferably into all the layers.

BRIEF DESCRIPTION OF THE DRAWING

In the text below, the invention is illustrated with a drawing which shows only one exemplary embodiment. Diagrammatically, in a greatly enlarged representation of the label film, the sole figure shows a sectional view of the multilayer label film.

DETAILED DESCRIPTION OF THE DRAWING

The label film of the invention that is depicted in the figure is a multilayer blown film having a layer construction formed by coextrusion. The layer construction comprises two outer layers 1 of polyethylene, a core layer 2 of polyethylene, and, either side of the core layer, an interlayer 3 of polypropylene, which has a melt flow index MFI of more than 4.0 g/10 min (as measured to ISO 1133 at 230° C. with 2.16 kg). The interlayers preferably consist of polypropylene homopolymer (PP-H), which has a melt flow index of between 5.0 and 15 g/10 min (as measured to ISO 1133 at 230° C. with 2.16 kg).

The core layer 2 consists of bimodal polyethylene, more particularly bimodal LMDPE and/or bimodal LLDPE. LMDPE can have a density of between 0.927 and 0.946 g/cm³, and LLDPE a density of between 0.917 g/cm³ and 0.926 g/cm₃. The core layer preferably has a density of between 0.925 g/cm³ and 0.94 g/cm³. Through the use of bimodal LMDPE/LLDPE it is possible to stabilize the film bubble that is produced in the course of blown film extrusion, and it is possible to process layers of polypropylene which would not be blowable on the basis of a high propylene melt flow index of more than 4.0 g/10 min alone.

The outer layers 1 consist of unimodal polyethylene, preference being given to outer layers of linear polyethylene, more particularly LLDPE and/or LMDPE. Besides LLDPE and LMDPE, the outer layers 1 may further comprise additional fractions of LDPE, Disposed between the outer layer 1 and the interlayer 3 there may additionally be an adhesion promoter layer 4. Suitable adhesion promoters are copolymers of ethylene and propylene.

The outer layers 1 have a thickness of less than 6 µm. The thickness of the outer layers is preferably 1 µm to 4 µm.

The interlayers 3 consisting of polypropylene and the core layer 2 of polyethylene each have a thickness of between 10 µm and 30 µm. Specifying the layer thicknesses and their proportion relative to one another allows the mechanical properties of the blown film to be varied.

The blown film can have a total thickness of 40 µm to 100 µm. The blown film preferably has a total thickness of between 50 µm and 70 µm.

The layers of the film may comprise customary additives such as antiblocking agents, processing assistants, and colorants.

WORKING EXAMPLE OF THE INVENTION

A blown film 66 µm thick was produced with a layer construction formed by coextrusion, comprising outer layers 3 µm thick and composed of unimodal LMDPE, interlayers 10 µm thick and composed of PP-H with a melt flow index (MFI) of 6.5 (as measured to ISO 1133 at 230° C. with 2.16 kg), and a core layer 24 µm thick and composed of bimodal LMDPE.

Comparative Example 1

Comparative example 1 relates to a three-layer blown film having a prior-art layer construction from DE 10 2007 045 117 A1, with outer layers made of polyethylene, 6 µm thick, and a core layer, 48 µm thick, composed of a polypropylene mixture with fractions of a polypropylene homopolymer (PP-H), of a polypropylene random copolymer (PP-RC) and of a polypropylene block copolymer (PP-BC).

Comparative Example 2

Comparative example 2 relates to a three-layer polyethylene film with layers of LDPE and HOPE, the fraction of PE-HD in the core layer being greater than the fraction of PE-HD in the outer layers.

The mechanical properties of the films stated above are set out in table 1. In accordance with the results of measurement, the blown film of the invention has balanced mechanical properties both in production direction (MD) and in transverse direction (CD). The blown film of the invention is notable more particularly for a high flexural stiffness. Despite the fact that the thickness of the blown film of the invention is much lower than the thickness of the polyethylene film employed for comparison (comparative example CE2), similar flexural stiffness values are achieved. Moreover, in. relation to comparative example CE1, the blown film of the invention has superior flexural stiffness values.

A good flexural stiffness is advantageous for inventive application as label film. For use as label film, the blown film is printed and is applied by means of an adhesive to a carrier, as for example to a siliconized paper or a polymeric film. The laminate consisting of label film and carrier is diecut in the course of further processing, with a trimmed waste section being detached as a diecutting matrix from the carrier. Separate label sections remain on the carrier. At the dispensing stage, in other words on application of the label to an article where its application is intended, the carrier, with a small flexural radius, is turned over at a large angle, with the label section parting from the carrier. The flexural stiffness of the label section must be sufficient to allow that part of the label section that is already parted from the detachment film, or from the carrier, to be moved in free-hanging form to the point where it bears on the article to be labeled, without it bending out of the intended path.

Furthermore, the blown film of the invention is notable for good diecutting qualities. In comparison to a polyethylene film, (comparative example CE2), the blown film of the invention has substantially better diecuttability.

TABLE 1

| Type | Thickness μm | Tensile strength (N/mm²) MD/CD | Modulus of elasticity (N/mm²) MD/CD | Flexural stiffness Deformation force (mN) MD/CD |
|---|---|---|---|---|
| Invention | 66 | 49.9/29.7 | 1079/1069 | 21.2/19.9 |
| CE1 | 60 | 60.8/30.0 | 1058/974 | 11.8/12.4 |
| CE2 | 82 | 19.8/21.4 | 455/530 | 19.9/24.6 |

GLOSSARY

Modulus of elasticity: the modulus of elasticity is determined according to DIN EN ISO 527 (issue 2013-07).

Flexural stiffness: the parameter measured is the deformation force F [mN] which comes about, when a film sample is bent to the set flexural angle α [degrees] with a preselected measurement length L [mm] and at a uniform angle of velocity. The measurements are carried out in a method based on DIN 53121, The values reported in table 1 were obtained for a flexural angle of 30° and a measurement length of 10 mm.

Tensile strength: the tensile strength is the stress calculated in the tensile test from the maximum tensile force achieved, based on the original cross section of the sample. The tensile strength is determined according to DIN EN ISO 527 (issue 2003-07).

We claim:

1. A multilayer blown film for producing labels, having a layer construction formed by coextrusion, and comprising two outer layers of polyethylene, each layer having a thickness of 1 to 4 μm, a core layer of polyethylene which comprises a bimodal polyethylene or a mixture of bimodal polyethylenes having a density of between 0.925 g/cm³ and 0.94 g/cm³, and, on either side of the core layer, an interlayer of polypropylene with a melt flow index (MFI) of between 5.0 and 15 g/10 min as measured to ISO 1133 at 230° C. with 2.16 kg.

2. The blown film according to claim 1, wherein the two outer layers of polyethylene consist of a unimodal polyethylene or of a mixture of unimodal polyethylenes having a density of between 0.925 g/cm³ and 0.94 g/cm³.

3. The blown film according to claim 2, wherein the outer layers of polyethylene consist of a linear polyethylene or of a mixture of LLDPE and LMDPE.

4. The blown film according to claim 1, wherein an adhesion promoter layer is disposed between the outer layer of polyethylene and the interlayer of polypropylene.

5. The blown film according to claim 1, wherein the polypropylene interlayers and the core layer of polyethylene each have a thickness of between 10 μm and 30 μm.

6. The blown film according to claim 1, having a total thickness of between 40 μm and 100 μm.

7. The blown film according to claim 6, having a total thickness of between 50 μm and 80 μm.

8. The blown film according to claim 6, having a total thickness of between 50 μm and 70 μm.

9. A multilayer blown film for producing labels, having a layer construction formed by coextrusion, and comprising two outer layers of polyethylene, each layer having a thickness of 1 to 4 μm, core layer of polyethylene which comprises a bimodal polyethylene or a mixture of bimodal polyethylenes having a density of between 0.925 g/cm³ and 0.94 g/cm³, and, on either side of the core layer, an interlayer of polypropylene with a melt flow index (MFI) of between 6.5 and 15 g/10 min as measured to ISO 1133 at 230° C. with 2.16 kg, wherein said core layer of polyethylene is bonded directly to the interlayers of polypropylene on either side of the core layer.

10. The blown film according to claim 9 wherein the core layer of polyethylene has a density of between 0.925 and 0.94 g/cm³ and consists essentially of bimodal linear medium density polyethylene having a density of between 0.927 and 0.946 g/cm³ and/or linear low density polyethylene having a density between 0.917 and 0.926 g/cm³.

11. The blown film according to claim 9 wherein the core layer of polyethylene consists essentially of bimodal linear medium density polyethylene having a density of between 0.927 and 0.946 g/cm³ and where on either side of the core layer, the interlayer of polypropylene has a melt flow index (MFI) of 6.5 g/10 min a measured to ISO 1133 at 230° C. with 2.16 kg.

* * * * *